US010186762B2

(12) United States Patent
Papp et al.

(10) Patent No.: US 10,186,762 B2
(45) Date of Patent: Jan. 22, 2019

(54) MOTOR VEHICLE ROOF ANTENNA MODULE, MOTOR VEHICLE AND METHOD FOR OPERATING THE ROOF ANTENNA MODULE

(71) Applicant: Audi AG, Ingolstadt (DE)

(72) Inventors: Aurel Papp, Karlskron (DE); Andreas Pohl, Denkendorf (DE); Jürgen Spehl, Wettstetten (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/063,088

(22) PCT Filed: Dec. 14, 2016

(86) PCT No.: PCT/EP2016/080888
§ 371 (c)(1),
(2) Date: Jun. 15, 2018

(87) PCT Pub. No.: WO2017/102787
PCT Pub. Date: Jun. 22, 2017

(65) Prior Publication Data
US 2018/0375199 A1    Dec. 27, 2018

(30) Foreign Application Priority Data
Dec. 15, 2015    (DE) .................. 10 2015 016 334

(51) Int. Cl.
*H01Q 1/32* (2006.01)
*H01Q 1/28* (2006.01)
(Continued)

(52) U.S. Cl.
CPC ........... *H01Q 1/283* (2013.01); *H01Q 1/3275* (2013.01); *H04L 9/0816* (2013.01);
(Continued)

(58) Field of Classification Search
CPC ....... H01Q 1/32; H01Q 1/3275; H04L 9/0816; H04L 63/0254; H04L 67/2823; H04B 1/006; H04B 1/0064
See application file for complete search history.

(56) References Cited

U.S. PATENT DOCUMENTS 6,694,235 B2    2/2004    Akiyami
9,653,788 B2    5/2017    Lerchner
(Continued)

FOREIGN PATENT DOCUMENTS

DE          10230351 A1    1/2003
DE    102007039809 A1    2/2009
(Continued)

OTHER PUBLICATIONS

International Preliminary Report on Patentability directed to releated International Patent Application No. PCT/EP2016/080888, dated Jun. 28, 2018, with attached English-language translations; 17 pages.

(Continued)

*Primary Examiner* — Hoang V Nguyen
(74) *Attorney, Agent, or Firm* — Sterne, Kessler, Goldstein & Fox P.L.L.C.

(57) ABSTRACT

The disclosure refers to a roof antenna module and to a method for operating the roof antenna module, wherein a communication control unit couples at least one transceiver with at least one bus connection and communication messages are transmitted between the at least one transceiver and the at least one bus connection. This approach prevents undesired manipulation of the motor vehicle from the outside. This approach uses a filter device of the communication control unit, that forwards a control instruction to the at least one bus connection only if the control instruction fulfills a predetermined safety criterion.

20 Claims, 2 Drawing Sheets

Figure 1:
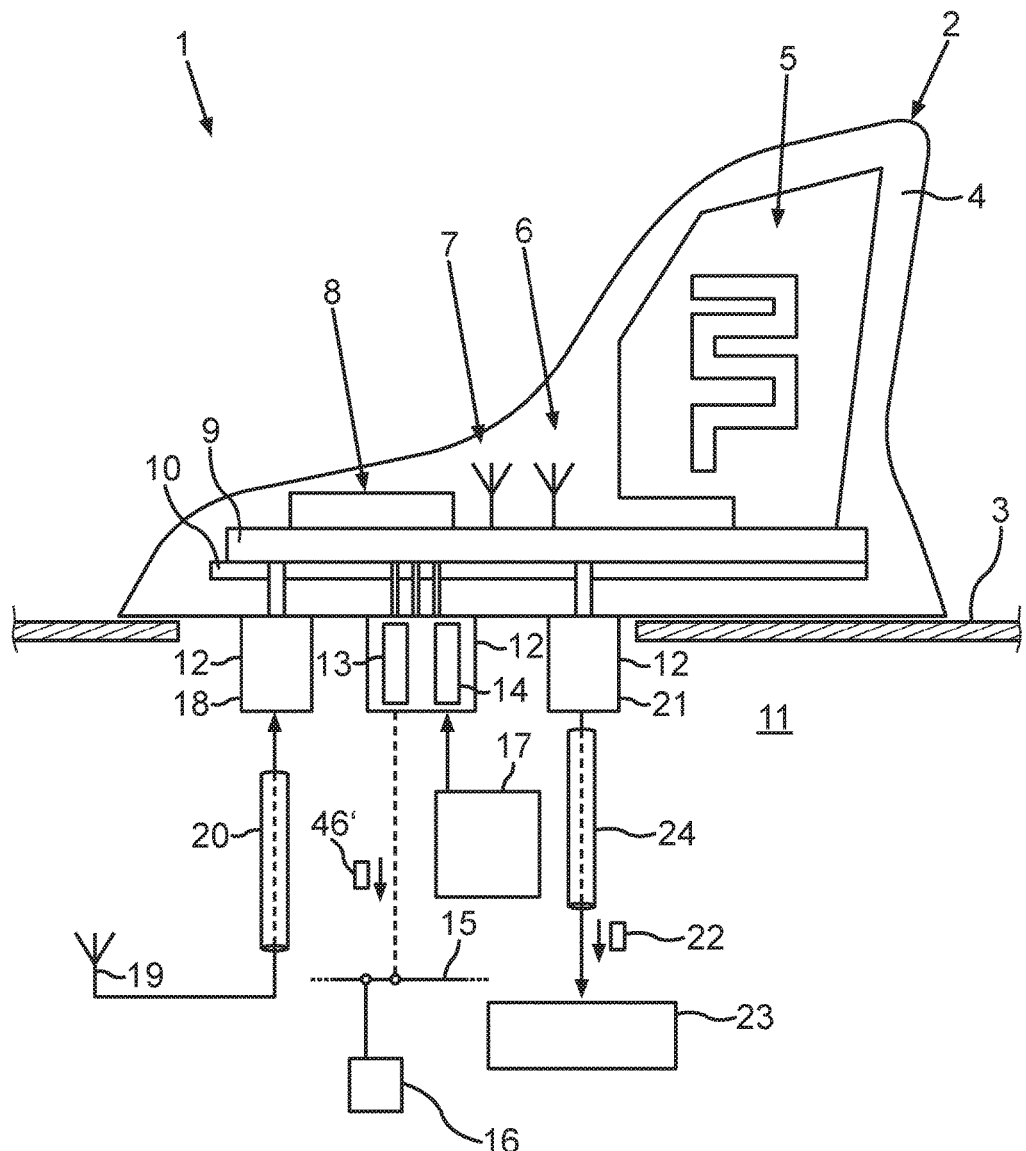

(51) Int. Cl.
  *H04W 52/02*   (2009.01)
  *H04L 29/06*   (2006.01)
  *H04L 9/08*    (2006.01)
  *H04L 29/08*   (2006.01)

(52) U.S. Cl.
  CPC ...... *H04L 63/0254* (2013.01); *H04L 67/2823* (2013.01); *H04W 52/0229* (2013.01)

(56) References Cited

U.S. PATENT DOCUMENTS

| | | |
|---|---|---|
| 2007/0279304 A1 | 12/2007 | Chakam et al. |
| 2010/0202353 A1 | 8/2010 | Talty et al. |
| 2013/0223568 A1* | 8/2013 | Schneider ............ H01Q 1/1271 375/316 |
| 2015/0095997 A1 | 4/2015 | Mabuchi |
| 2015/0200691 A1* | 7/2015 | Ehrentraut ............. H04B 1/006 455/553.1 |

FOREIGN PATENT DOCUMENTS

| | | |
|---|---|---|
| DE | 102013015478 A1 | 3/2015 |
| DE | 202014003956 U1 | 5/2015 |
| EP | 1903632 A1 | 3/2008 |

OTHER PUBLICATIONS

International Search Report and Written Opinion of the International Searching Authority directed to related International Patent Application No. PCT/EP2016/080888, dated Aug. 3, 2017, with attached English-language translation; 15 pages.

* cited by examiner

_US 10,186,762 B2_

MOTOR VEHICLE ROOF ANTENNA MODULE, MOTOR VEHICLE AND METHOD FOR OPERATING THE ROOF ANTENNA MODULE

TECHNICAL FIELD

The present approach refers to a roof antenna module to be positioned on the roof of a motor vehicle. The roof antenna module provides at least one transceiver with a respective antenna and at least one bus connection for connecting the roof antenna module to a respective digital communication bus of the motor vehicle. The at least one transceiver on one hand and the at least one bus connection on the other are coupled through a communication control unit, which is able to transmit communication messages between the at least one transceiver and the at least one bus connection. Embodiments of the invention also comprises a motor vehicle provided with the roof antenna module and a method for operating the roof antenna module.

BACKGROUND

In the state of the art a roof antenna module is known, which integrates a microcontroller, in order to transmit communication messages between a transceiver and a communication bus. EP 1 903 632 A1 discloses an antenna module, which has a plurality of transceivers for generating and receiving radio signals from mobile radio, a Wi-Fi (Wireless local area network) and a Bluetooth apparatus. Bus connections are provided such as for a CAN (Controller Area Network), a LIN (Local Interconnect Network), or a MOST bus (MOST—Media Oriented Systems Transport). The communication messages may be transmitted through the antenna module by using different diversity methods, such as a time and frequency division multiplexing.

US 2010/020353 A1 discloses a roof antenna module having an integrated microcontroller. The microcontroller creates a network node for a LAN (Local Area Network). The roof antenna module may also be provided with a radio receiver and the already described transceiver for mobile radio and Wi-Fi. Finally, a GPS receiver (GPS—Global Positioning System) is also provided.

DE 20 2014 003 956 U1 discloses an enclosure for a roof antenna module, in which antennas, transceivers, and a microcontroller may be integrated.

Roof antenna modules which provide a direct coupling of transceivers for radio signals on one hand and digital communication buses of a motor vehicle on the other hand cause a safety hazard for the operation of the motor vehicle. It may happen, for example, that while driving a motor vehicle, a control instruction for activating an emergency brake is sent via radio to the motor vehicle and that this control command is supplied from the roof antenna module to the communication bus of the motor vehicle thus actually causing an unwanted full braking of the vehicle to occur.

The integration of a bus connection into a roof antenna module is nevertheless advantageous, since in this way the cabling requirements for lines for transmitting of high-frequency signals may be reduced.

BRIEF DESCRIPTION OF DRAWINGS/FIGURES

Figure 2:
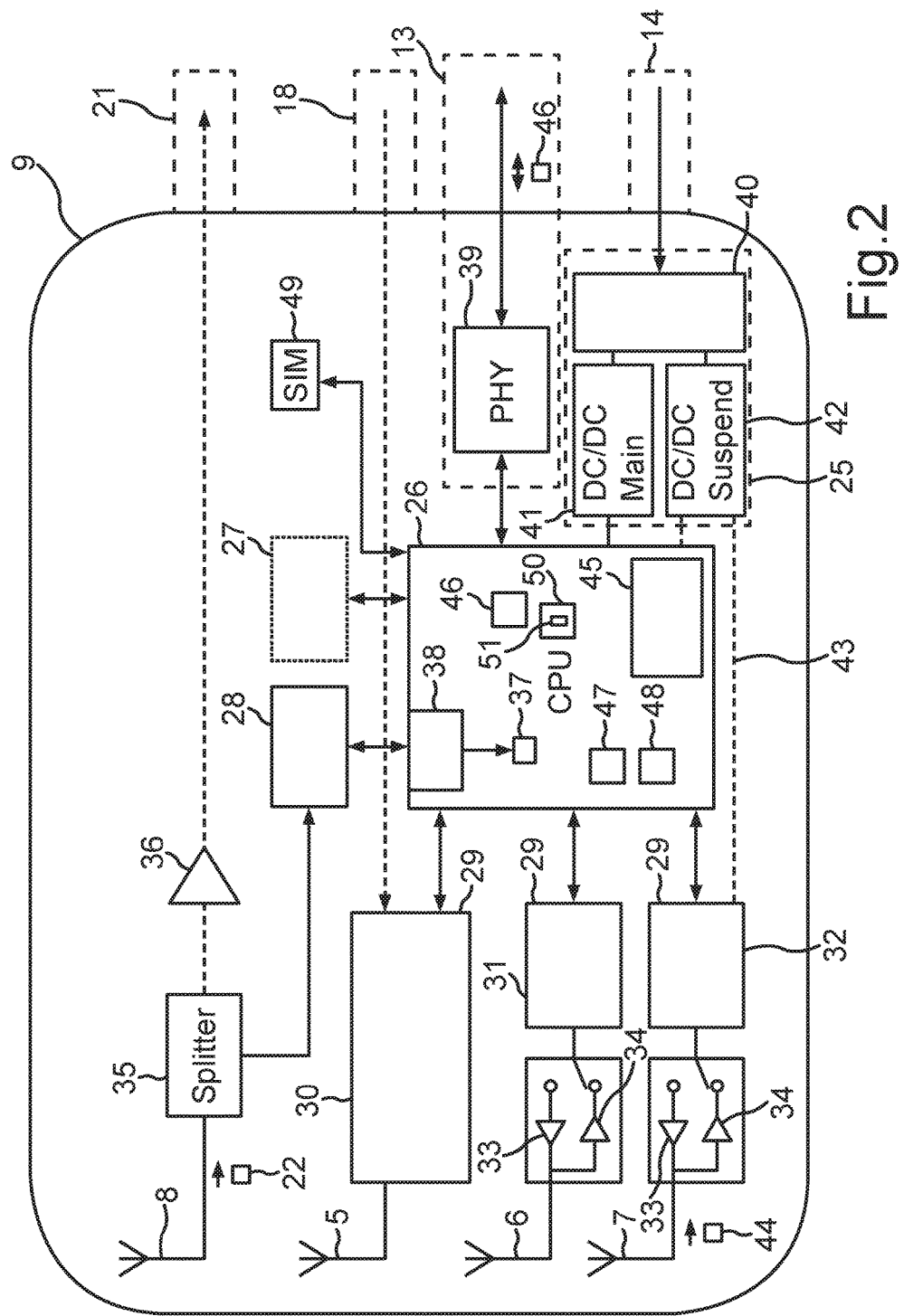

FIG. 1 shows a schematic representation of an embodiment of the roof antenna module in a side view; and FIG. 2 shows a schematic representation of a wiring diagram of the roof antenna module of FIG. 1.

DETAILED DESCRIPTION

The object of embodiments of the invention is to reduce, in a motor vehicle, the wiring complexity between a communication bus and a radio signal transceiver, without causing a safety hazard during the operation of the motor vehicle.

This object is achieved by the subject matter of the independent claims. Advantageous embodiments of the invention are provided in the dependent claims, in the description, and in the figures.

Embodiments of the invention provides a roof antenna module to be positioned on the roof of a motor vehicle. The roof antenna module is provided, in a known manner, with at least one transceiver having a respective antenna and at least one bus connection for connecting the roof antenna module to a respective digital communication bus of the motor vehicle. The at least one transceiver is coupled to the at least one bus connection through a communication unit, which is adapted for transmitting communication messages between the at least one transceiver on one hand and the at least one bus connection on the other hand.

In this case, in order to prevent that a communication message consisting of an undesired or damaging control instruction is supplied to the at least one communication bus, the invention provides the following protection. The communication unit has a filter device, which is adapted for forwarding a control instruction, which is received through the at least one transceiver over a radio link from outside the motor vehicle and addressed to a bus user of the at least one communication bus, and which is contained in the communication message, to the at least one bus connection only if the control instruction fulfills a predetermined safety criterion. In other words, the filter device filters the communication messages depending on whether they contain a control instruction, which has to be forwarded to the at least one bus connection. If such a control instruction is recognized, it is checked whether it fulfils the safety criterion. Through the safety criterion, it may thus be determined which control instruction is actually transmitted via radio link into the at least one communication bus of the motor vehicle or may reach the same. The communication control unit may to this end be provided, for example, on the basis of a microprocessor or microcontroller. Correspondingly, the filter device may be a program module of the communication control unit. A control instruction in the context of embodiments of the invention is a command, which controls or sets the operating behavior of the bus user. The bus user in the context of the present approach is to be considered as a control device, which is connected to the at least one communication bus and which may receive control instructions through the at least one communication bus, in order to execute or implement the corresponding command from the control instruction, thus to activate or deactivate a corresponding function.

Embodiments of the invention provides the advantage that a control instruction which is received over a radio link cannot reach the at least one communication bus of the motor vehicle without being checked. On the contrary, an undesired control instruction, is captured by the filter device. Which control instructions are undesired may be easily set by determining the safety criterion.

In the context of the present invention, a transceiver is a device for converting a signal between a radio frequency for the antenna and a base band frequency for the communication control unit. In other words, the communication messages have to be considered radio signals having a carrier frequency, which is generated by the transceiver during emission or which is removed again by the transmitter during reception. The bus connection is provided, on the other hand, to exchange the digital communication messages with other bus users of the motor vehicle without using a carrier frequency. The bus connection may be, for example, a bus connection for a CAN bus, a FlexRay bus, a MOST bus, or an ethernet network. In the context of embodiments of the invention, a bus connection comprises both the mechanical connector assembly and the downstream physical layer according to the ISO/OSI communication model (ISO—International Organization for Standardization, OSI—Open Systems Interconnection Model).

The transceiver may be, for example, a transceiver for mobile radio (GSM, UMTS, LTE), a transceiver for a WLAN communication (Wi-Fi), a Bluetooth transceiver, and/or a transceiver for a vehicle-to-vehicle communication (according to the Car-2-X Standard). A transceiver may also be considered a receiver for SDR (Software Defined Radio), such as DAB (Digital Audio Broadcast), a video receiver such as DVB-T (Digital Video Broadcasting-Terrestrial), and/or a receiver for an FM radio signal or an AM radio signal.

The invention also comprises optional embodiments, whose characteristics provide further advantages.

An embodiment refers to an advantageous embodiment of the safety criterion. According to this embodiment, the safety criterion comprises that the control instruction is encrypted with a predetermined cryptographic key. In other words, the control instruction is only forwarded to the at least one bus connection, if based on the used cryptographic key, it is recognized that the control instruction originates from a predetermined or authorized source. Additionally or as an alternative, the safety criterion may comprise the fact that the control instruction has to be generated by a sender which has been previously registered. In other words, regardless of the encryption, based for example on a sender address, it may be checked whether the control instruction is admissible. In addition or as an alternative, the safety criterion may comprise the fact that the control instruction exclusively contains at least one control command among a predetermined set of admissible control commands. Thereby the quantity of control commands which may actually be transferred only to the at least one communication bus is predetermined. Additionally or as an alternative, the safety criterion may comprise the fact that the control instruction is addressed to a predetermined bus user. In other words, not just any bus user may be addressed or controlled from outside the motor vehicle via the roof antenna module.

In an embodiment, in the roof antenna module, a SIM-element (SIM—Subscriber Identity Module) for user-independent provision of a communication connection to a mobile network is integrated. "User-independent" in this context means that the SIM-element is fixedly mounted into the roof antenna module and is operated independently from a user contract with a phone company of the mobile radio network. The communication control unit is adapted in such a way that it may be controlled via the communication connection from outside the motor vehicle. Thus, the advantage is achieved that for example the safety criterion may be set or improved or adapted from outside the motor vehicle, for example by the manufacturer of the motor vehicle. Additionally, it is possible, via the roof antenna module, to execute a remote maintenance of the motor vehicle such as transmitting an operating software for the communication control unit or for another bus user of the at least one communication bus of the motor vehicle, to the motor vehicle and to perform an update.

An embodiment solves the problem that by coupling the at least one transceiver to the at least one communication bus via the communication control unit, the transmission of communication messages of a bus user to a vehicle-external unit may be hindered or blocked by the communication messages of another bus user to another vehicle-external unit or its transmission bandwidth or data rate may be reduced. This may cause the emission or reception of communication messages, which are essential for the operation of the motor vehicle, to be delayed or blocked, since the communication messages, for example for music reception or other entertainment media, exhaust the available bandwidth. This embodiment thus provides that the roof antenna module has a data storage and the communication control unit is adapted for buffering at least some of the communication data to be transmitted from the at least one transceiver, on one hand and the at least one bus connection, on the other hand, into the data storage and/or to transmit the same according to a predetermined priority rule. In this way the advantage is obtained, the communication messages are "temporarily parked", i.e. may be temporarily stored in the data storage, in order to preferably transmit other communication messages between a transceiver and a bus connection. The priority rule may thus allow the setting of the selection of the preferred communication messages.

An embodiment solves the problem that the communication messages are transmitted in different communication buses according to a respectively different communication standard and these communication messages have to be adapted to the transmission over a transceiver according to a communication standard to the corresponding radio interface. In this embodiment, the communication control unit has a gateway device, which is adapted for adapting a format of at least some of the communication messages to be transmitted between the at least one transceiver and the at least one bus connection to a predetermined communication standard. The gateway device may additionally be adapted for exchanging communication messages between two bus connections and also for the communication standard. The gateway device may to this end be provided with corresponding communication stacks for the respective communication bus and/or the communication over the respective transceiver. The gateway device may for example enable the transfer or mutual conversion of communication messages according to the CAN standard (thus CAN messages) and the same communication messages according to the ethernet standard (i.e. ethernet data packets).

According to an embodiment, the roof antenna module is a one-piece component. In other words, the described components of the roof antenna module are arranged in a single enclosure. Thus, the roof antenna module may be arranged or attached by performing a few mounting interventions on the motor vehicle.

A drawback of a compact roof antenna module may be that it may not advantageously emit a radio signal from its mounting position in each direction. An embodiment consists in that at least one antenna connection device is provided for the respective connection of a module-external additional antenna wherein the at least one antenna connection device is respectively directly connected to the at least one transceiver or the communication control unit. The antenna connection device provides the advantage that, for example, an additional antenna for a diversity sending method and/or reception method may be provided. A further advantage is that the additional antenna may supply a signal, for example in case of a curved vehicle roof, by means of the additional antenna, also to a region shielded by the curvature, or may receive a signal from this region.

An embodiment refers to an embodiment of the roof antenna module, in which at least a receiver device for a positioning signal of a global navigation satellite system (GNSS) is provided. The receiving device may thus be a GPS receiver. In this embodiment, the communication control unit has an extrapolation device, which is adapted for determining, in absence of the positioning signal, a vehicle position based on the operation data of the motor vehicle received through the at least one bus connection from the respective communication bus of the vehicle and for providing the same to at least one bus connection. The extrapolation device may for example also be based on a program module of the communication control unit. Through it, advantageously, also in the case that the satellite signals of the GNSS may not currently be received, the vehicle position may still be determined. To this end, for example, operation data may be odometrical data of the motor vehicle, such as the wheel rotation speed and/or the position of the steering wheel.

An embodiment prevents an excessive error alarm rate while rejecting control instructions. To this end, the radio transmission path is more reliably protected against disturbances. This is obtained in the embodiment in that the communication control unit and/or the at least one transceiver are provided for setting an error coding and/or a sending method and/or a receiving method for the communication messages depending on an environmental signal describing the environment of the motor vehicle. The set error coding may for instance be a channel coding. Sending and/or receiving methods for example set the use of a single antenna or two antennas. A typical multi-antenna method is a MIMO method (MIMO—Multiple Input Multiple Output). The determined environmental signal may for example be a signal-to-noise ratio. A further environmental signal may for example be position data, which indicates whether the motor vehicle is under a clear sky or for example in a tunnel or in a parking garage. A further environmental signal may be a relative position or a direction of a proximate vehicle-external sending and receiving device, such as a Wi-Fi router within a parking garage or a tunnel. Through this embodiment, an adaptive coding and a direction-dependent reception for the at least one receiver are set depending on the environmental signal.

In an embodiment, the communication control unit has a diagnostic device. This may also be a program module for the communication control unit. The diagnostic device is adapted for sending through the at least one bus connection and/or the at least one transceiver respective diagnostic data. The diagnostic data describe a current operating condition of the roof antenna module and/or errors recognized during the operation of the roof antenna module. Since the diagnostic data are provided through the at least one bus connection in the motor vehicle, during a self-diagnosis or a diagnosis through a diagnostic device in the motor vehicle, it may be ascertained whether the roof antenna module is operating perfectly. The provision of diagnostic data over the at least one transceiver has the additional advantage of allowing a remote diagnosis.

In an embodiment, a power supply of the roof antenna module is connected through a wake-up line to the at least one transceiver, and is adapted for receiving, when the communication control unit is deactivated, through the at least one transceiver, a wake-up signal and to activate the communication control unit upon receiving the wake-up signal.

In case multiple transceivers are provided, preferably separate signal paths are provided between each transceiver and the communication control unit. Thereby a so-called cross-talk, i.e. the mutual influence on the transceiver signals, is reduced.

A further advantage is due to a modular structure of the transceiver part, through which the roof antenna module may be selectively provided with one or more transceivers, and thus the transceivers may be provided independently from one another.

As already said, the invention also comprises a motor vehicle with at least one digital communication bus and with a roof antenna module connected to the at least one communication bus, which represents an embodiment of the inventive roof antenna module. The motor vehicle is preferably an automobile, in particular a passenger car.

Finally, the invention also comprises the already described method for operating the roof antenna module. Through the communication control unit, the at least one transceiver is coupled to the at least one bus connection and communication messages are transmitted between the at least one transceiver on one hand and the at least one bus connection on the other hand. Said filter device transmits a control instruction, which is received through the at least one transceiver via radio link from outside the motor vehicle and which is addressed to a bus user of a communication bus connected through the at least one bus connection to the at least one bus connection, only if the control instruction fulfills a predetermined safety criterion. The safety criterion may comprise one of the already described conditions.

The invention also comprises embodiments of the inventive method, which comprise characteristics, such as those already described in the context of the embodiments of the inventive roof antenna module. For this reason, a description of the corresponding embodiments of the inventive method are omitted here.

The following exemplary embodiment is a preferred embodiment of the invention. In the exemplary embodiment, the described components of the embodiment represent respective individual independent characteristics of the invention, which may also develop the invention independently from each other, and thus have to also be considered to be individual components of the invention, which may also be provided in a different combination with respect to the one shown. The described embodiment may also be completed by additional already described characteristics of the invention.

In the figures, functionally equivalent elements are provided with the same reference signs.

FIG. 1 shows a roof antenna module 2 of a motor vehicle 1, which may be mounted on the vehicle roof 3. In an enclosure 4 of the roof antenna module, a mobile radio antenna 5, two near field communication antennas 6, 7, and one GNSS receiving antenna 8 may be provided. The enclosure 4 may be shaped like a fin. The antennas 5 to 8 may for example be provided on a printed board 9. A schematic wiring diagram of the printed board 9 is provided in FIG. 2.

The printed circuit board 9 may have a shield 10, by means of which a radiation of antenna signals of the antennas 5 to 8 into a vehicle interior 11 can be prevented. The printed circuit board 9 can be connected to the rest of the motor vehicle 1 by means of end plug or sockets 12. A connection socket 12 with a bus connection 13 and a supply connection 14 for a voltage supply can be provided. Via the bus connection 13, the roof antenna module 2 may be connected to a communication bus 15 of the motor vehicle. The communication bus 15 can be, for example, a CAN bus or another of the named bus types. Additional bus users 16 can be connected to the communication bus 15, which are represented in FIG. 1 only by a single element. Via the supply connection 14, the roof antenna module 2 may, for example, be connected to an electrical system 17 of the motor vehicle 1. The electrical system 17 may be, for example, a 12-volt electrical system.

An additional connection plug or an additional connection socket 12 can be configured, for example, as an antenna connection device 18, through which an additional antenna 19 can be connected. The connection between the additional antenna 19 and the antenna connection device 18 may be obtained through a coaxial cable 20. Another connection plug or a further connection socket 12 may be a GNSS connection 21, through which a position signal 22 received by the GNSS antenna 8 can be forwarded to an infotainment system (information entertainment system) or navigation device 23. This connection can also be provided over a coaxial line 24.

FIG. 2 illustrates how a power supply 25, a communication control unit 26, a data storage 27, a GNSS receiver device 28, and a transceiver 29 for each of the antennas 5 to 7 can be provided in the roof antenna module 2. One of the transceivers 29 may be a mobile radio modem 30, another transceiver 29 a WLAN module 31, and another transceiver 29 may be a Bluetooth module 32. The modules 31, 32 can be alternately connected to the respective antenna 6, 7 for a transmission operation via a power amplifier (PA—Power Amplifier) 33 and for a reception operation via a low-noise amplifier (LNA —Low-Noise Amplifier) 34. The GNSS receiver device 28 may be coupled via a splitter 35 with the GNSS antenna 8. By means of the splitter 35, it is possible to provide the position signal 22 both to the GNSS receiving device 28 and to the optional GNSS output 21. In this case, an amplification may be provided via a low-noise amplifier LNA 36. For an extrapolation of a vehicle position 37, an extrapolation device 38 may be provided, which, in absence of the position signal 22, may still determine the vehicle position 37 on the basis of operating data of the motor vehicle 1, which can be received via the bus connection 13.

The bus connection 13 is shown in FIG. 2 with its so-called physical layer 39 (PHY) of the ISO-OSI reception model.

The power supply 25 can have a protective circuit and/or filter circuit 40 in order to block faults from the vehicle electrical system 17. Furthermore, a DC voltage supply 41 (DC/DC main) may be provided for the printed circuit board 9. Furthermore, a wake-up circuit 42 (DC/DC Suspend) may be provided, which may be coupled to the Bluetooth module 32 via a wake-up line 43 in order to be able to activate the roof antenna module 2 via an on-vehicle wake-up signal 44. This may be used for a radio-based unlocking of the motor vehicle 1.

The communication control unit 26 may, for example, be provided on the basis of a microprocessor or microcontroller (CPU—Central Processing Unit). An operating software 45 may be stored in a flash memory. The data storage 27, however, can be a volatile data memory (RAM—Random Access Memory).

Through the roof antenna module 2, a radio-based communication between the motor vehicle 1 and external units, such as a smartphone, a home network, a public mobile network, or other motor vehicles may be possible by appropriate transceiver hardware including the necessary antennas and the necessary software modules for the communication control unit 26 being completely integrated in the roof antenna module 2. By providing the communication control unit 26 with the bus connection 13, the roof antenna module 2 in the motor vehicle behaves like an independent communication control unit with a direct connection to the vehicle bus system. Through a gateway device 46 between radio-based standard communication services and the vehicle's own networking architecture of the communication bus 15, an exchange of communication messages 47 is facilitated. An essential feature of the roof antenna module 2 is the complete integration of all communication radio transceiver components including all necessary microcontroller and vehicle bus connection electronics (for example CAN and/or FlexRay and/or Ethernet) directly and centrally in the roof antenna module 2, as well as the thus allowed direct conversion of the radio signals and the communication digital radio signals in bus signals and messages necessary for the vehicle networking of the communication bus 15 without additional high-frequency lines or coaxial cables and without further intermediate control devices in the vehicle passenger compartment 11. In this intelligent roof antenna module 2, appropriate software processes may aggregate the different radio services and also prioritize the same according to a prioritization rule 47 and process them centrally. The individual transceivers 29 can be kept as an assembly option, thus providing a modular concept for different equipment levels, which results in a cost advantage in the production of roof antenna modules 2 in mass production.

The equipment option is therefore freely scalable and only requires the desired transceiver semiconductor chip for the provision of the corresponding radio interface. The communication control unit 26 provides central processing of the communication messages 26 in an application logic and control. By means of appropriate software scheduling of the individual program modules or tasks, a plurality of functionalities can be implemented in parallel by the communication control unit 26. Thus, the described prioritization according to the prioritization rule 27 and the scheduling and buffering of the data can be realized by means of the data storage 27. Between the antennas 5 to 7 and by means of the additional antenna 19, a transmit diversity may be provided. In this case, the connection device 18 is optional in order to be able to provide the remote second additional antenna 18, for example in the case of a strongly curved vehicle roof 3. During transmission and reception, an adaptive coding of the signals can be provided. By means of a diagnostic device 48, a central diagnosis can be provided, wherein different operating states can be divided into diagnostic classes. In this case, the communication control unit 26 may also be used for the diagnosis of other control units because of its connection to the communication bus 15. A central software flash process for updating the operating software 25 can also be provided via a radio link. Due to the compact arrangement of all components on the printed circuit board 9 or even of a plurality of printed circuit boards in the housing 4, a minimization of the coupling of the different radio services is optimized by means of an optimized structure of a scaled-up antenna, EMC (Electromagnetic Compatibility), shielding, and PCD layout concept (PCD—Printed Circuit Board). This ensures interoperability of all radio services. Scalability can also be provided with regard to the communication control unit used, depending on the resource required by the applications. By coupling with all the transceivers 29 and the communication bus 15, the communication control unit 26 allows a data multiplexing of all radio services and the distribution over the digital communication bus 15 (CAN, FlexRay, MOST, Ethernet) to all connected data sinks, i.e. the bus users 16 (for example, navigation, infotainment central computer, eCall, telematics, vehicle tracking, telephony). Optionally, radio reception can also be enabled in the roof antenna module 2 by the integration of SDR (Software Defined Radio) in order to be able to use conventional broadcast reception services such as DAB, DVB-T, FM radio also via the roof antenna module 2. Optionally, the integration of an embedded SIM 49 or a configurable eUICC SIM is possible. Alternatively, an external SIM reading device with corresponding switching logic can be provided. Through such an external SIM reading device, it is then possible to make calls via a user-specific SIM card via the central rooftop antenna module 2.

In particular, the following transceivers are preferably provided: IEEE802.11a/b/g/n/p/ac-capable WLAN Transceiver, Bluetooth transceiver, mobile radio modem (LTE, LTE proximity services such as LTE direct and M2M (Machine to Machine) communication), a CPU for application and administration, a data storage and a flash memory, the connection to the communication bus 15, the antennas described for GNSS, WLAN (preferably including 5.9 GHz and Car2X standard), Bluetooth, and mobile radio.

Further advantageous components are a radio frequency front end for de-coupling and interoperability, as can be provided by the described amplifier 33, 34, a radio frequency combiner and radio frequency switch (Radio Frequency RF), the GNSS receiver, communication stacks for transmitting the communication messages 46 within the communication control unit 26, corresponding application software for controlling the communication, and the described extrapolation device 48.

To hereby prevent that, in the communication bus 15, as one of the communication messages 46, an unwanted control instruction 46' is radio transmitted to one of the bus users 16, a filter device 50 is provided, which may include a firewall functionality and a cryptography module. As a result, the communication within the communication bus 15 is decoupled from the communication via the radio interface of the transceiver 29. A communication message 46 may thus contain, for example, a control instruction 46'. Conversely, there are also communication messages which are not necessarily control instructions 46' but, for example, status messages or status messages. By means of the filter device 50, only such control instructions 46' and preferably also other communication messages 46 are forwarded to the communication bus 15, which are classified as safe, for which purpose a corresponding security criterion 51 for the filter device 50 is stored or provided. In addition, it can be provided that only information from the communication bus 15 (such as control instructions or status messages sent by the motor vehicle 1) that actually may leave the motor vehicle 1 are forwarded to the radio interface of the transceiver 29. For this purpose, the security criterion 51 can be configured accordingly.

In conclusion, the example shows how through the invention a transceiver with a control device may be provided in a roof antenna.

The invention claimed is:

1. A roof antenna module to be positioned on a roof of a motor vehicle comprising:
   at least one transceiver having a respective antenna;
   at least one bus connection for connecting the roof antenna module to a respective digital communication bus of the motor vehicle; and
   a communication control unit through which the at least one transceiver is coupled to the at least one bus connection, the communication control unit configured to transmit a plurality of communication messages between the at least one transceiver and the at least one bus connection,
   wherein the communication control unit includes a filter device configured to forward a control instruction to the at least one bus connection if the control instruction fulfills a predetermined safety criterion, wherein the control instruction is received through the at least one transceiver via a radio link from outside the motor vehicle, is addressed to a bus user of the at least one communication bus, and is contained within the plurality of communication messages.

2. The roof antenna module of claim 1, wherein the predetermined safety criterion comprises at least one of: the control instruction is encrypted with a predetermined cryptographic key, the control instruction has been generated by a previously registered sender, the control instruction has been addressed to a predetermined bus user, or the control instruction exclusively contains at least one control command among a predetermined set of admissible control commands.

3. The roof antenna module of claim 1, further comprising:
   a Subscriber Identity Module (SIM)-element for a user-independent provision of a communication connection to a mobile radio network, wherein the SIM-element is integrated in the roof antenna module, and
   wherein the communication control unit is configured to be controlled through the communication connection from outside the motor vehicle.

4. The roof antenna module of claim 1, wherein the communication control unit further comprises a data storage, and the communication control unit is further configured to:
   buffer at least some of the plurality of communication messages into the data storage, and
   transmit the buffered plurality of communication messages according to a predetermined priority rule.

5. The roof antenna module of claim 1, wherein the communication control unit further includes a gateway device that is configured to adapt a format of at least some of the plurality of communication messages according to a predetermined communication standard.

6. The roof antenna module of claim 1, wherein the roof antenna module is a one-piece component.

7. The roof antenna module of claim 1, further comprising:
   at least one antenna connection device for a respective connection of a module-external additional antenna, wherein the at least one antenna connection device is respectively directly connected to the at least one transceiver or to the communication control unit.

8. The roof antenna module of claim 1, further comprising:
   at least one receiver device configured to receive a position signal of a Global Navigation Satellite System (GNSS); and
   an extrapolation device in the communication control unit, the extrapolation device configured to:
   determine, in case of an absence of the position signal, a vehicle position based on operating data of the motor vehicle received through the at least one bus connection from the respective communication bus, and provide the vehicle position to the at least one bus connection.

9. The roof antenna module of claim 1, wherein the communication control unit is configured to set at least one of an error coding, a sending method, or a receiving method for the plurality of communication messages, wherein the setting depends on an environmental signal that describes an environment of the motor vehicle.

10. The roof antenna module of claim 1, wherein the at least one transceiver is configured to set at least one of: an error coding, a sending method, or a receiving method for the plurality of communication messages, wherein the setting is based on an environmental signal that describes an environment of the motor vehicle.

11. The roof antenna module of claim 1, wherein the communication control unit further comprises:
a diagnostic device configured to transmit through the at least one bus connection and/or through the at least one transceiver, respective diagnostic data which describe a current operating status of the roof antenna module and/or errors detected during the operation of the roof antenna module.

12. The roof antenna module of claim 1, further comprising:
a power supply connected through a wake-up line to the at least one transceiver, configured to:
receive, when the communication control unit is deactivated, a wake-up signal through the at least one transceiver; and
activate the deactivated communication control unit upon receiving the wake-up signal.

13. A motor vehicle comprising:
at least one digital communication bus; and
a roof antenna module connected to the at least one communication bus, the roof antenna module comprising:
at least one transceiver having a respective antenna,
at least one bus connection for connecting the roof antenna module to a respective digital communication bus of the motor vehicle, and
a communication control unit through which the at least one transceiver is coupled to the at least one bus connection, the communication control unit configured to transmit a plurality of communication messages between the at least one transceiver and the at least one bus connection, wherein the communication control unit includes a filter device, configured to forward a control instruction to the at least one bus connection if the control instruction fulfills a predetermined safety criterion, wherein the control instruction is received through the at least one transceiver via a radio link from outside the motor vehicle, is addressed to a bus user of the at least one communication bus, and is contained within the plurality of communication messages.

14. The motor vehicle of claim 13, wherein the predetermined safety criterion comprises at least one of: the control instruction is encrypted with a predetermined cryptographic key, the control instruction has been generated by a previously registered sender, the control instruction has been addressed to a predetermined bus user, or the control instruction exclusively contains at least one control command among a predetermined set of admissible control commands.

15. The motor vehicle of claim 13, wherein the communication control unit further comprises a data storage, and the communication control unit is further configured to:
buffer at least some of the plurality of communication messages into the data storage, and
transmit the buffered plurality of communication messages according to a predetermined priority rule.

16. The motor vehicle of claim 13, wherein the communication control unit further includes a gateway device that is configured to adapt a format of at least some of the plurality of communication messages according to a predetermined communication standard.

17. A method for operating a roof antenna module of a motor vehicle, comprising:
receiving a control instruction through at least one transceiver via a radio link from outside the motor vehicle, the control instruction being addressed to a bus user of at least one communication bus;
connecting, by a communication control unit, the at least one transceiver to at least one bus connection, the connecting supporting transmitting a plurality of communication messages between the at least one transceiver and the at least one bus connection; and
forwarding the control instruction, by a filter device of the communication control unit, to the at least one bus connection if the control instruction fulfills a predetermined safety criterion, wherein the at least one transceiver, the at least one bus connection and the communication control unit form at least a part of the roof antenna module, wherein the control instruction is included within the plurality of communication messages.

18. The method of claim 17, wherein the predetermined safety criterion comprises at least one of: the control instruction is encrypted with a predetermined cryptographic key, the control instruction has been generated by a previously registered sender, the control instruction has been addressed to a predetermined bus user, or the control instruction exclusively contains at least one control command among a predetermined set of admissible control commands.

19. The method of claim 17, wherein the communication control unit further comprises a data storage, and the method further comprises:
buffering at least some of the plurality of communication messages into the data storage, and
transmitting the buffered plurality of communication messages according to a predetermined priority rule.

20. The method of claim 17, further comprising:
adapting, by a gateway device, a format of at least some of the plurality of communication messages according to a predetermined communication standard.

* * * * *